Dec. 10, 1968  W. L. WANMAKER ET AL  3,415,757
FLUORO-SUBSTITUTED EUROPIUM ACTIVATED GADOLINIUM, YTTRIUM
AND LANTHANUM OXIDES
Filed Aug. 5, 1965
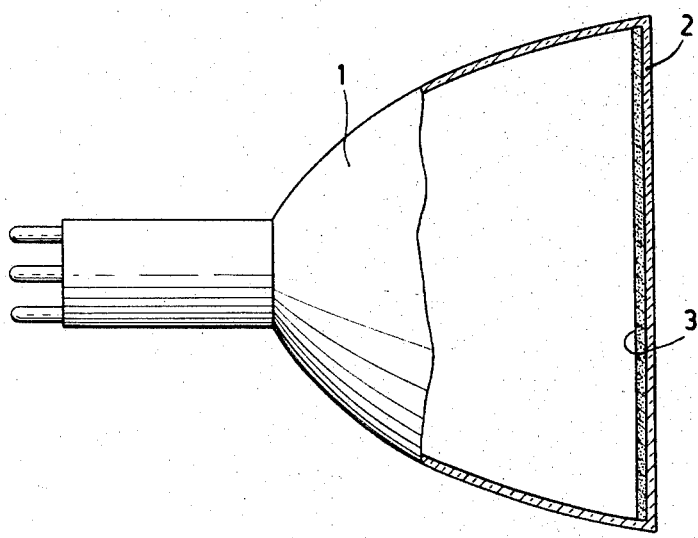
INVENTORS
WILLEM L. WANMAKER &
ALFRED BRIL
BY
AGENT

United States Patent Office 3,415,757
Patented Dec. 10, 1968

3,415,757
FLUORO-SUBSTITUTED EUROPIUM ACTIVATED GADOLINIUM, YTTRIUM AND LANTHANUM OXIDES
Willem Lambertus Wanmaker and Alfred Bril, Emmasingel, Eindhoven, Netherlands, assignors to North American Philips Company, Inc., New York, N.Y., a corporation of Delaware
Filed Aug. 5, 1965, Ser. No. 477,495
Claims priority, application Netherlands, Aug. 7, 1964, 6409066
3 Claims. (Cl. 252—301.4)

ABSTRACT OF THE DISCLOSURE

Red luminescent phosphor for color television cathode ray tubes consisting of an europium activated oxide of gadolinium, yttrium or lanthanum wherein a small portion of the oxygen is replaced by fluorine.

The invention relates to a luminescent screen, particularly for use in a cathode-ray tube for the reproduction of colour pictures, to a radiation source comprising such a screen and to red-luminescent substance for use in such a screen.

For many purposes there is desirable a luminescent substance which produces red light upon excitation by electromagnetic rays or by corpuscular particles e.g. electrons. Electromagnetic radiation is emitted for instance by a mercury vapour discharge either of low-pressure nature or of high-pressure nature. Since the emitted mercury spectrum contains only a small amount of red rays, it is desirable to improve the colour rendition obtainable by such discharge lamps by converting part of the emitted ultraviolet radiation into red light.

For the reproduction of colour pictures by means of a cathode-ray tube use is frequently made of a luminescent screen having three luminescent substances which emit, upon excitation by electrons, blue, green and red light respectively. In order to obtain a bright image it is necessary for the luminescent substance to have a high yield. For the blue and green components there is a wide range of substances fulfilling this requirement, but for the red component the choice is very restricted. One of the most frequently used substances is silver-activated zinc cadmium sulphide. A further, often employed substance is zinc orthophosphate activated with manganese.

An international agreement has been made to have the colour point of the red component correspond to the wavelength of 611 m$\mu$. Although the aforesaid red-luminescent substances emit, at this wavelength, an adequate amount of light, they have the disadvantage of having an emission spectrum with a broad red band, so that a considerable quantity of energy of the excitation radiation is converted into radiation with wavelengths beyond 661 m$\mu$. As a result the lumen-equivalent is low.

A further point of importance for luminescent substances for use in colour reproduction tubes is the so-called "weight" of a lumen, which is proportional to $1/y$, wherein $y$ is the ordinate of the colour point in the internationally fixed $xyz$-colour diagram. For the known red phosphors this "weight" is unfavourable owing to the high $y$-value.

A luminescent screen according to the invention is characterized in that it contains a red-luminescent substance consisting of an oxyfluoride of one or more of the elements gadolinium, yttrium or lanthanum with a fluorine content lying between 0.1 and 5.0% by weight activated with 0.005 to 0.20 atom of europium per mol of oxyfluoride.

The oxyfluorides of gadolinum, yttrium and lanthanum emit, upon activation with europium light with very narrow bands in the red portion of the spectrum by excitation by electrons and ultraviolet rays, and particularly strong lines at 612 and 614 m$\mu$, that is to say very near the aforesaid, standardized wavelength for the red component of reproduction screens of colour television tubes.

The lumen equivalent of the europium-activated oxyfluorides of gadolinium, yttrium and lanthanum is particularly high, that is to say about 300 lumen/w. The known, aforesaid, silver-activated cadmium sulphide has a lumen equivalent of not more than 75 lumen/w. and the manganese-activated zinc orthophosphate 140 lumen/w. The light yield lies between that of the two last-mentioned substances.

With respect to the europium-activated oxides of gadolinium, yttrium and lanthanum, not containing fluorine, a higher quantum yield is obtained upon the excitation by electrons. The highest quantum yields are obtained with a fluorine content lying between 0.2 and 1.0% by weight of fluorine and an europium content lying between 0.04 and 0.20 atom/mol oxyfluoride.

The higher europium contents are to be preferred, since the emitted radiation becomes much "redder" without a drop in yield.

The use of fluorine has the further advantage that it is not necessary in the manufacture of luminescent oxyfluorides to use high heating temperatures. This is, in general, important, but particularly for these substances, since they display a point of transition from one phase to the other at a temperature of about 1300° C.

The oxyfluorides according to the invention can be manufactured in a simple manner by means of a mixture of the oxides of one or more of the elements gadolinium, yttrium or lanthanum with europium oxide and a suitably chosen quantity of ammonium fluoride. It is preferred, however, to introduce the europium in the form of europium fluoride and to add such a quantity of ammonium fluoride that after heating the luminescent substance at a temperature of about 1200° C. the correct quantity of fluorine is contained in the substance. It should then be considered that part of the fluorine disappears from the reaction mixture.

The invention will be described with reference to a table. This table indicates the molecular and weight composition of a number of starting mixtures from which the red-luminescent oxyfluorides according to the invention are obtained by heating at 1200° C. in air for two hours. There is furthermore indicated the luminous yield at room temperature upon excitation by ultraviolet radiation of wavelength of 253.7 m$\mu$ and the quantum yield $q$ upon excitation by electrons.

The luminous yield (L.O.) at room temperature is measured as a relative value with respect to a mixture of antimony- and manganese-activated halophosphate and such a quantity of calcium carbonate that the light output was reduced to 54% of the initial light output of the calcium halophosphate.

Apart from the aforesaid favourable properties, the oxyfluorides according to the invention have a satisfactory lumen maintenance with respect to temperature, which means that even at high temperatures the quantity of emitted red radiation is little smaller than the quantity of radiation emitted at room temperature. It is therefore possible to load the luminescent screens to a high value, which may be the case in colour television display tubes, for projection purposes, and for use in a red-correcting layer in a high-pressure mercury-vapour discharge lamp.

TABLE

| Gd$_2$O$_3$ | | EuF$_3$ | | NH$_4$F | | Eu$_2$O$_3$ | | Y$_2$O$_3$ | | L.O at room temp. | q |
| --- | --- | --- | --- | --- | --- | --- | --- | --- | --- | --- | --- |
| Mol | Gms. | Mol | Gms. | Mol | Gms. | Mol | Gms. | Mol | Gms. | | |
| 1.00 | 3.62 | 0.06 | 0.13 | 0.30 | 0.11 | | | | | 127 | 7.5 |
| 1.00 | 10.87 | | | 0.18 | 0.20 | 0.03 | 0.32 | | | 98 | 5.5 |
| 1.00 | 10.87 | 0.06 | 0.38 | | | | | | | 108 | 5.9 |
| | | 0.06 | 0.21 | 0.10 | 0.063 | | | 1.00 | 3.84 | 95 | 5.8 |
| | | 0.15 | 0.53 | 0.10 | 0.063 | | | 1.00 | 3.84 | 101 | 5.4 |
| 1.00 | 10.84 | | | | | 0.03 | 0.32 | | | 61 | 4.7 |

The drawing illustrates a cathode-ray tube composed of the conical part 1 and the window part 2. On the interior side of this window a luminescent screen 3 according to the invention has been applied.

What is claimed is:

1. A red-luminescent substance particularly adapted for use in a cathode ray tube for the reproduction of color images, said red-luminescent substance consisting of a fluoro substituted oxide of at least one element selected from the group consisting of gadolinium, yttrium and lanthanum, having a fluorine content of between 0.1 and 5% by weight and activated by 0.005 to 0.20 atom of europium per mol of oxide.

2. The red-luminescent substance of claim 1 wherein the europium content lies between 0.04 and 0.20 atom per mol of the oxide.

3. The red-luminescent substance of claim 2 wherein the fluorine content lies between 0.2 and 1.0% by weight.

References Cited

UNITED STATES PATENTS 3,250,722   5/1966   Borchardt _____ 252—301.4

TOBIAS E. LEVOW, *Primary Examiner.*

ROBERT D. EDMONDS, *Assistant Examiner.*

U.S. Cl. X.R.

313—92